United States Patent [19]
Kessler

[11] Patent Number: 6,097,655
[45] Date of Patent: Aug. 1, 2000

[54] PULL THROUGH FIFO MEMORY DEVICE

[75] Inventor: Stephen L. Kessler, Essex Junction, Vt.

[73] Assignee: International Business Machines Corporation, Armonk, N.Y.

[21] Appl. No.: 09/055,002

[22] Filed: Apr. 3, 1998

[51] Int. Cl.[7] .................................................. G11C 16/04
[52] U.S. Cl. ..................................... 365/221; 365/189.05
[58] Field of Search ................................ 365/221, 189.01, 365/189.04, 189.05; 395/872, 877

[56] References Cited

U.S. PATENT DOCUMENTS

| | | | |
|---|---|---|---|
| 4,163,291 | 7/1979 | Suzuki et al. | 365/221 |
| 4,459,681 | 7/1984 | Ohtsuka | 365/78 |
| 4,672,646 | 6/1987 | Van Maren | 377/70 |
| 4,833,655 | 5/1989 | Wolf et al. | 365/221 |
| 5,095,462 | 3/1992 | Norris | 365/221 |
| 5,122,988 | 6/1992 | Graeve | 365/219 |
| 5,157,633 | 10/1992 | Aoki | 365/221 |
| 5,473,756 | 12/1995 | Traylor | 365/221 |
| 5,809,521 | 9/1998 | Steinmetz et al. | 395/872 |

FOREIGN PATENT DOCUMENTS 0 260 411 A2   3/1988   European Pat. Off. .

*Primary Examiner*—David Nelms
*Assistant Examiner*—David Lam
*Attorney, Agent, or Firm*—Schmeiser, Olsen & Watts; Eugene I. Shkurko

[57] ABSTRACT

A pull through FIFO memory structure consisting solely of latches and logic circuits wherein the FIFO structure includes an empty/full bit for determining whether each cell in the FIFO structure includes FIFO data. If a cell is identified as not containing FIFO data, then each previous cell's FIFO data will be advanced during a clock signal.

17 Claims, 5 Drawing Sheets

| INPUTS | | OUTPUT |
|---|---|---|
| CLK | D | $Q^{T+1}$ |
| 0 | 0 | $Q^T$ |
| 0 | 1 | $Q^T$ |
| 1 | 0 | $Q^T$ |
| 1 | 1 | $Q^T$ |
| ⌐ | 0 | 0 |
| ⌐ | 1 | 1 |
| ⌐ | 0 | $Q^T$ |
| ⌐ | 1 | $Q^T$ |

$Q^T$ = OUTPUT Q AT TIME T
$Q^{T+1}$ = OUTPUT Q AT TIME T+1
⌐ = CLK SIGNAL CHANGES FROM 0 TO 1
⌐ = CLK SIGNAL CHANGES FROM 1 TO 0

*FIG. 4*

PULL THROUGH FIFO MEMORY DEVICE

BACKGROUND OF THE INVENTION

1. Field of the Invention

This invention relates to FIFO (First In/First Out) memories, and more particularly relates to an improved pull through FIFO memory system.

2. Description of Related Art

FIFO memories are widely used as intermediate buffers where there is a need to transfer binary data between systems or devices which operate at different frequencies and where the order of the data must remain unchanged. These devices are often constructed of multiple shift register stages coupled for cascade operations. Data is clocked into the first shift register stage at some shift in frequency, and after a certain latency time or fall through delay, the data is clocked out of the last stage at a different shift out frequency. The fall through delay is the time it takes for data to propagate through the FIFO, from input to output.

In the prior art, FIFO's are implemented using a RAM (random access memory) structure that includes a write pointer and a read pointer to store and keep track of the available and occupied locations. Therefore, additional logic is required to increment and decrement the pointers once data has been written to or read from the FIFO. For example, in order for a RAM based FIFO to keep track of the data in each stage of the FIFO, a RAM based FIFO with d stages would require log 2(d) input/outputs (I/O's). Moreover, in order to provide a system wherein data could be written and read simultaneously, a RAM based FIFO would require two-ported RAM's, which are physically larger than a single ported RAM and require {2 * log 2(d)} I/O's for the address, and {2 * w} I/O's for the data, where w is the size of each data word in bits. Accordingly, there is a need to provide a FIFO data storage structure that eliminates the need for RAM and write and read pointers.

SUMMARY OF THE INVENTION

The present invention seeks to avoid the limitations and drawbacks of prior art FIFO memories by providing a FIFO structure that includes a plurality of cells for holding FIFO data, wherein the FIFO structure is entirely constructed only of latches and logic circuits. The structure includes an empty/full bit that is associated with each cell for indicating whether the cell is empty or is holding FIFO data. A clock is coupled to each cell for providing a clock signal thereto. Each cell loads FIFO data only from an immediately previous full cell in response to a clock signal when the cell's empty/full bit indicates that the cell is not holding any FIFO data. Furthermore, the structure includes a system for performing multiple advances of FIFO data in the FIFO structure during a single clock cycle. In addition, the structure includes means for extracting FIFO data at internal stages in the FIFO structure.

The FIFO structure comprises a plurality of sequentially coupled stages or cells. Each cell can receive data from an immediately previous cell, and can transfer data to an immediately ensuing cell. Each cell may have numerous ensuing cells that reside between the cell and the output of the FIFO structure. However, each cell has only one immediately ensuing cell.

In operation, the FIFO memory device operates as follows during each clock cycle. If, during any clock cycle, FIFO data is to be read out of the FIFO structure, FIFO data from each cell in the structure is advanced to an immediately ensuing cell. Thus, in essence, all of the data in the FIFO structure is shifted one cell toward the FIFO's output. Alternatively, if no FIFO data is to be read out of the FIFO structure during the clock cycle, the system checks to see if any cells are empty (i.e., do not contain FIFO data). If there is an empty cell, then the FIFO data from each previous cell is "pulled" or advanced to the immediately ensuing cell. Thus, during each clock cycle in which data is not read out of the FIFO structure, each cell is given the opportunity to advance its data if one of the ensuing cells does not contain FIFO data.

It is therefore an advantage of the present invention to implement a FIFO structure that does not use RAM or pointers.

It is therefore a further advantage of the present invention to provide a solution that is totally latch based and is testable via standard LSSD techniques.

It is therefore a further advantage of the present invention to provide a solution where data can be written or read on every clock cycle independent of the type of access on a prior cycle.

It is therefore a further advantage of the present invention to provide a solution that allows for extraction of FIFO data at an internal stage of the FIFO structure.

It is therefore a further advantage of the present invention to provide a simple technique to determine if a FIFO cell is full or empty.

The foregoing and other objectives, features, aspects, and advantages of the present invention may be more fully appreciated by considering the following detailed description and claims.

BRIEF DESCRIPTION OF THE DRAWINGS

FIG. 4 is a state table of a latch used in the preferred embodiment of the present invention;

DESCRIPTION OF THE PREFERRED EMBODIMENTS

Figure 1:
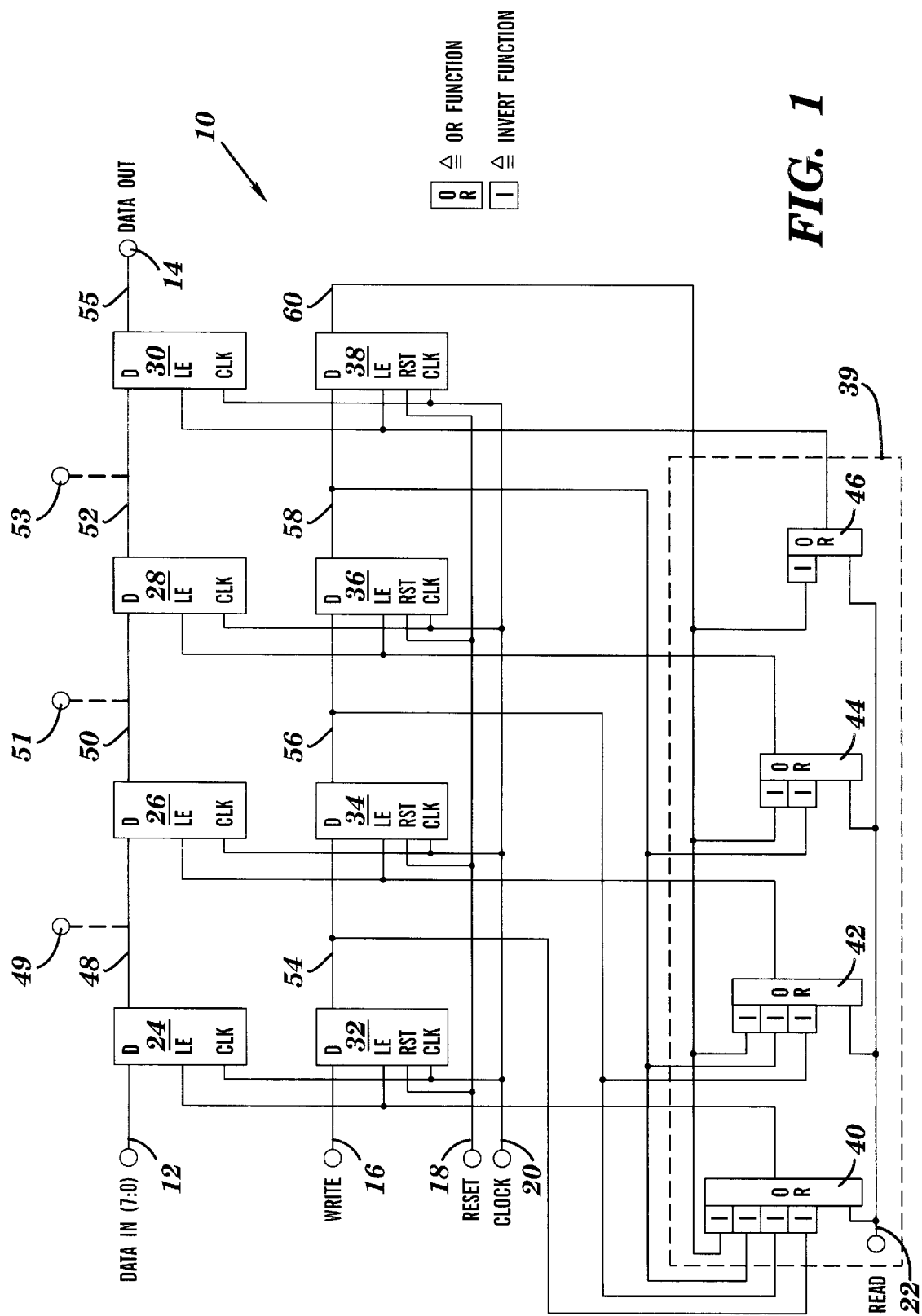
FIG. 1 is a circuit diagram of a FIFO structure in accordance with a preferred embodiment of the present invention.

Referring now to the drawings, FIG. 1 depicts a FIFO structure 10 that consists solely of latches and logic circuits. As shown, the FIFO structure 10 includes an input 12, an output 14, and four sequentially coupled cells 24, 26, 28 and 30. Output cell 30 holds the data that is next to be read from the FIFO structure 10. The FIFO structure 10 further includes a write input 16, a reset input 18, a clock input 20 and a read input 22. The write input 16 is used to cause data to be written into the FIFO structure 10. Reset input 18 causes each of the cells to be cleared. Clock input 20 is used for delivering a clock signal to each of the cells 24, 26, 28 and 30. Read input 22 causes data to be read out of the FIFO structure 10 from output cell 30. It should be recognized that the structure depicted here is for the purpose of example only and could be enlarged or modified as necessary.

Figure 2:
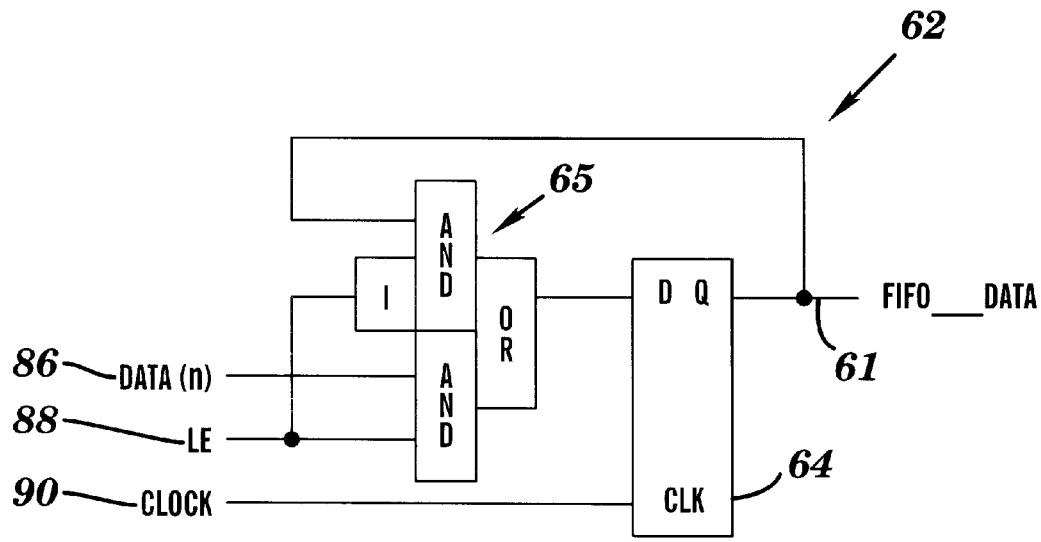
FIG. 2 is a circuit diagram of a cell in accordance with a preferred embodiment of the present invention.

FIG. 2 depicts a detailed schematic of a cell 62, such as those cells 24, 26, 28 and 30 of FIG. 1, for holding FIFO data. The cell 62 includes a latch 64 and combinational logic 65. The cell 62 includes inputs for receiving FIFO data 86, a latch enable (LE) 88, and a clock signal 90. The cell 62 includes an output line 61 that holds and maintains FIFO data. The state table for the latch implemented in this circuit is shown in FIG. 4. Referring back to FIG. 1, it can be seen that output lines 48, 50, 52 and 55 contain the FIFO data of the respective cells 24, 26, 28 and 30. Data from a cell is advanced to an immediately ensuing cell during a clock cycle when the cell's LE is enabled by the latching system 39. The operation of the latching system 39 is described below.

Figure 3:
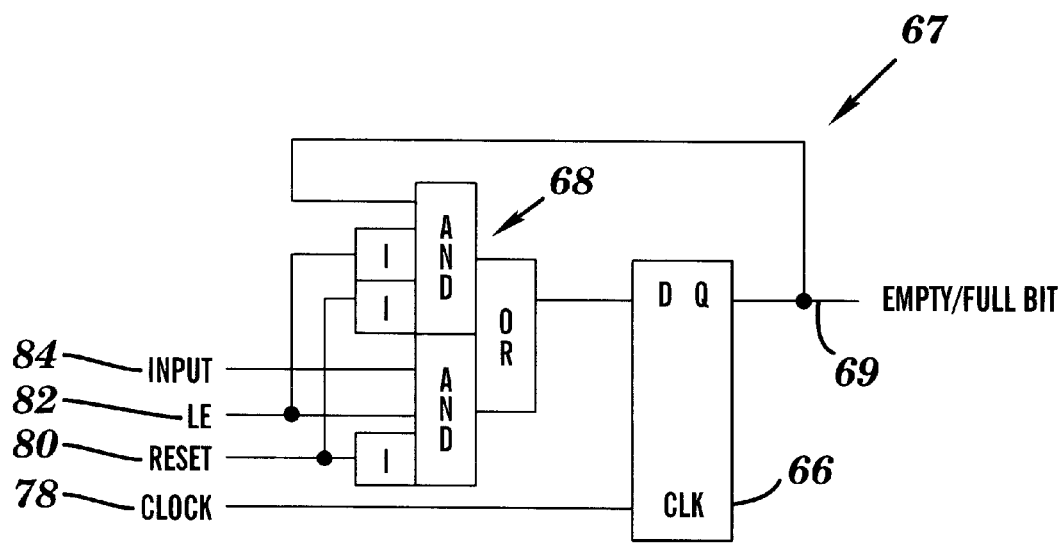
FIG. 3 is a circuit diagram of an indicator circuit for holding the empty/full bit in accordance with a preferred embodiment of the present invention.

Each cell 24, 26, 28 and 30 also includes a corresponding indicator circuit 32, 34, 36 and 38 for holding a value (hereinafter, an "empty/full bit") that indicates if the corresponding cell is empty or is holding FIFO data. Referring to FIG. 3, a detailed schematic of a indicator circuit 67, such as those circuits 32, 34, 36 and 38 of FIG. 1, is shown. The indicator circuit 67 includes a latch 66, combinational logic 68, and an output 69 that maintains the empty/full bit data for the corresponding cell. Each indicator circuit includes a clock input 78, a latch enable input (LE) 82, a reset input 80 and a data input 84 for receiving empty/full bit data. Similar to the operation of the cells 24, 26, 28 and 30, each empty/full bit is advanced to an immediately ensuing indicator circuit during each clock cycle in which an LE signal is generated by the latching system 39. Thus, referring back to FIG. 1, the output 54, 56, 58, and 60, of each corresponding indicator circuit 32, 34, 36 and 38 indicates if FIFO data exists at the output 48, 50, 52 and 55 of each cell, respectively.

As noted, the FIFO structure 10 includes a latching system 39 comprised of logic 40, 42, 44 and 46 along with read input 22. The latching system 39 includes two mechanisms for advancing FIFO data. Each of the two mechanisms checks for a particular condition during each clock cycle. The first condition under which data will be advanced is when a read signal exists at read input 22, indicating that data is to be read out of the FIFO structure. This signal causes data to be read out of the output cell 30 on line 55 and causes data from each cell to be advanced to each cell's immediately ensuing cell. Thus, if during a clock signal a read signal is detected on read line 22, FIFO data from cell 24 will be advanced to cell 26, FIFO data in cell 26 will be advanced to cell 28, and FIFO data in cell 28 will be advanced to cell 30. If a particular cell is not holding any data then, for that cell, no data will be advanced.

If the first condition does not exist, the latching system 39 checks for a second condition, namely, whether or not there exist any empty cells. The latching system 39 performs this test by checking the output 54, 56, 58 and 60 (i.e., the empty/full bits) of each indicator circuit 32, 34, 36 and 38 to determine if any of the corresponding cells are empty and contain no FIFO data. For example, if the output 58 of circuit 36 contains a value of zero, then it is understood that the accompanying cell 28 does not contain any FIFO data. When this condition exists for a particular cell, the latching system will cause each previous cell to advance its data to its respective immediately ensuing cell. For example, if cell 28 is empty, the latching system will cause data from cells 24 and 26 to be advanced to cells 26 and 28, respectively. Accordingly, any time that a cell containing FIFO data (e.g., cell 24) is situated such that any one of the ensuing cells (26, 28 or 30) does not contain FIFO data, the FIFO data in the cell (cell 24) will be advanced to its immediately ensuing cell (cell 26).

In addition to advancing FIFO data under either of these above mentioned conditions, the empty/full bit data in the corresponding indicator circuit is likewise advanced to an immediately ensuing indicator circuit in parallel with the data in the corresponding cell. Therefore, when data from cell 24 is advanced to cell 26, the empty/full bit data 54 from indicator circuit 32 is advanced to indicator circuit 34. Thus, the FIFO structure provides FIFO data that essentially includes an extra bit 54, 56, 58, 60 for tracking the existence of FIFO data in each cell 24, 26, 28 and 30, respectively.

Figure 6:
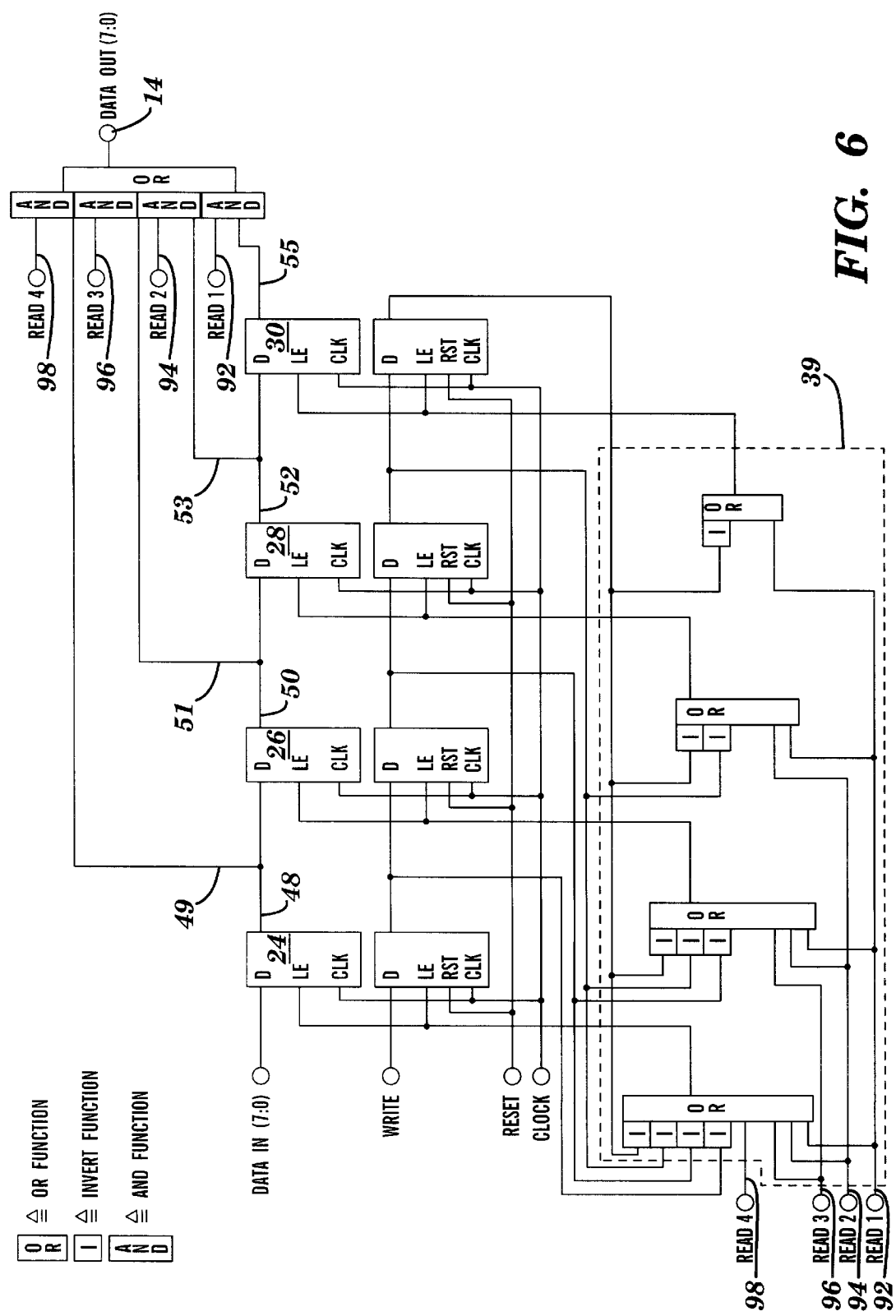
FIG. 6 depicts the system of FIG. 1 with additional circuitry for reading data from any of the FIFO's cells.

In addition to reading data from the output cell 30, the circuit of FIG. 1 may be further modified such that data can be read out of any of the intermediate cells 24, 26 and 28. An example of such a modification is depicted in FIG. 6. In the system of FIG. 6, multiple read inputs 92, 94, 96 and 98 are included for choosing which cell's output is to be read. Thus, according to FIG. 6, data on any of lines 49, 51, 53 or 55 may be read directly out of the FIFO. Furthermore, anytime a read occurs from a particular cell, that cell is essentially "emptied" by the latching system 39 and all of the previous cells forward their data in accordance with the scheme described above.

Figure 5:
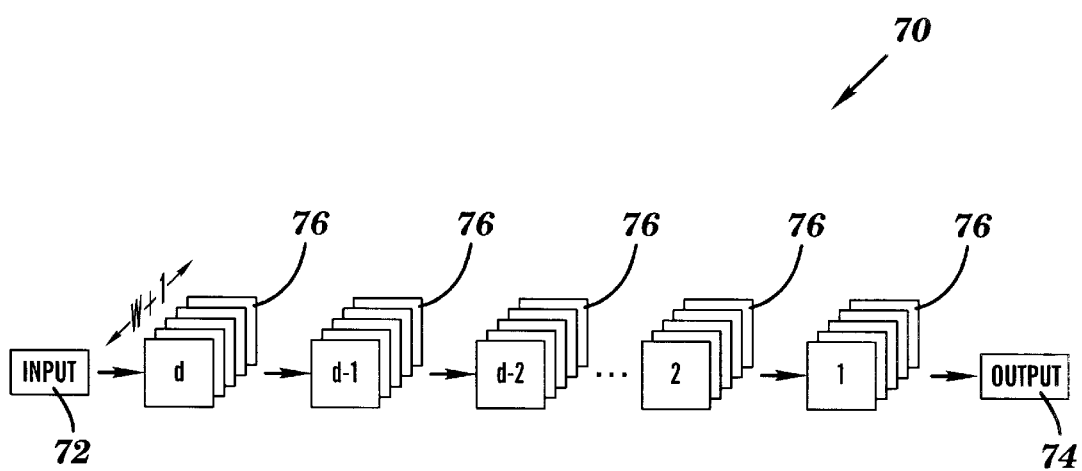
FIG. 5 is a conceptual overview of the preferred embodiment of the present invention.

Conceptually, a FIFO structure 70 in accordance with the present invention is depicted in FIG. 5. The FIFO structure 70 includes multiple stages d, d-1, d-2, . . . , 2, 1 for holding data wherein each stage includes a data width of w+1, where w is the number of bits in the width of the data. The FIFO is thus w+1 wide by d words deep, where d is the number of w+1 words, or stages in the data storage structure. Accordingly, if the stages are numbered d, d-1, d-2, . . . 2, 1, where the data input 72 is connected to stage d, stage d feeds d-1, stage d-1 feeds stage d-2, . . . , stage 2 feeds stage 1 and stage 1 is the data output 74 of the FIFO structure 70. In each stage of the d deep FIFO, the w+1 th bit 76 represents the "empty/full" bit and indicates whether that stage is empty or occupied.

Conceptually, the FIFO operates as follows with respect to a stage n, where n could be any one of the d stages, and n−1 is an immediately ensuing stage. If stage n−1 is empty, the n−1 stage pulls the data from stage n into it. The pulling action continues until stage n−1 is loaded with valid data and the w+1th bit 76 is set. The pulling action cascades backwards towards the data input 72 of the FIFO structure. If stage n−1 is empty, it pulls data from stage n, the pulling action on stage n causes stage n to pull data from stage n+1, the pulling action on stage n+1 causes stage n+1 to pull data from stage n+2 and so on until stage d is reached. At system reset, every stage's w+1th bit 76 is cleared or set to empty. Thus, after a reset, stage 1 and all other stages behind stage 1 are trying to pull data into their respective stages.

When data is written into the FIFO, the w+1th bit 76 in stage d is set to indicate a word is present in this stage. This word is then pulled into the FIFO until it reaches a stage n where the stage in front, stage n−1 (i.e., the immediately ensuing stage), is occupied. Then, because stage n is occupied, it stops pulling data from stage n+1. However, since stage n+1 is now empty, it will continue to pull data from all previous stages. When data is read out of the FIFO, the w+1th bit 76 in stage 1 is likewise forced out to indicate that the stage is empty. This causes all prior stages to pull data from their previous stage. At a minimum, data will advance one stage forward any time there is an empty stage anywhere ahead of the data. Data is advanced until it bumps into a stage which is already occupied.

The foregoing descriptions of the preferred embodiment in the invention have been presented for purposes of illustration and description. They are not intended to be exhaustive or to limit the invention to the precise form disclosed, and obviously many modifications and variations are possible in light of the above teachings. Such modifications and variations that may be apparent to a person skilled in the art are intended to be included within the scope of this invention as defined by the accompanying claims.

What is claimed is:

1. An apparatus comprising:
   a FIFO structure having a plurality of cells for holding FIFO data, wherein the FIFO structure is entirely constructed only of latches and logic circuits, and wherein each of the cells comprises an empty/full bit for indicating if a corresponding one of the cells is holding FIFO data;
   a clock coupled to each cell, said clock for providing clock signals to each cell; and
   wherein each of the plurality of cells loads FIFO data only from an immediately previous full cell during a clock signal when the empty/full bit of the cell indicates that the cell is not holding FIFO data.

2. The apparatus of claim 1, wherein only one of the cells includes means for receiving FIFO write data and only one of the other cells includes means for outputting FIFO read data.

3. The apparatus of claim 2, wherein said only one of the cells receives FIFO write data during a same clock signal that said only one other of the cells outputs the FIFO read data.

4. The apparatus of claim 1, wherein the empty/full bit indicates that its corresponding cell is empty during a same clock signal wherein FIFO data in said corresponding cell is being loaded into a next FIFO cell from a previous FIFO cell, such that FIFO data in multiple successive full cells all advance forward one cell during said same clock signal.

5. A FIFO memory device consisting of latches and logic circuits, comprising:
   a plurality of sequentially coupled cells coupled to an output cell, wherein each cell includes a corresponding indicator circuit for determining if the cell contains FIFO data;
   a clock coupled to each cell and its corresponding indicator circuit for providing clock signals thereto;
   a first latching system that, during a clock signal, advances FIFO data from each sequentially coupled cell containing FIFO data to an immediately ensuing cell if FIFO data is read from the output cell; and
   a second latching system that, during a clock signal, will advance FIFO data from each sequentially coupled cell to the immediately ensuing cell if the sequentially coupled cell has any ensuing cells not containing FIFO data.

6. The FIFO memory device of claim 5, wherein the plurality of sequentially coupled cells includes an input cell for receiving FIFO write data.

7. The FIFO memory device of claim 5, further comprising a system for extracting FIFO data from any one of the sequential cells.

8. A method of implementing a FIFO memory device that consists of latches and logic circuits, wherein the memory device comprises a plurality of sequentially coupled cells coupled on a first end to an output cell, comprising the steps of:
   providing a clock that is coupled to each cell for providing clock signals thereto;
   for each clock signal, performing the steps of:
   if FIFO data is read out of the output cell, advancing FIFO data from each cell to an immediately ensuing cell;
   if FIFO data is not read out of the output cell, for each cell, advancing FIFO data to an immediately ensuing cell if any of the cell's ensuing cells do not contain FIFO data prior to the clock signal.

9. The method of claim 8, further comprising the step of providing a reset signal that will clear each cell.

10. The method of claim 8, wherein each cell includes an indicator circuit for holding an empty/full indicator bit value, further including the step of:
    advancing the empty/full indicator bit value of each cell to an immediately ensuing indicator circuit when the FIFO data in a corresponding cell is advanced.

11. A first-in/first-out (FIFO) memory device consisting of latches and logic circuits, comprising:
    a plurality of sequentially coupled cells coupled to an output cell, wherein each cell includes a corresponding indicator circuit for determining if the cell contains FIFO data;
    a clock coupled to each cell and its corresponding indicator circuit for providing clock signals thereto;
    a first latching system that, during a clock signal, advances FIFO data from each sequentially coupled cell containing FIFO data to an immediately ensuing cell if FIFO data is read from the output cell; and
    a second latching system that, during a clock signal, will advance FIFO data from each sequentially coupled cell to the immediately ensuing cell if the sequentially coupled cell has any ensuing cells not containing FIFO data;
    wherein each corresponding indicator circuit holds a bit value that is advanced to an immediately ensuing indicator circuit when the FIFO data in a corresponding cell is advanced.

12. The FIFO memory device of claim 11, wherein the plurality of sequentially coupled cells includes an input cell for receiving FIFO write data.

13. The FIFO memory device of claim 11, further comprising a system for extracting FIFO data from any one of the sequential cells.

14. An apparatus comprising:
    a first-in/first-out (FIFO) structure having a plurality of cells for holding FIFO data, wherein the FIFO structure does not include a random access memory (RAM), and wherein each of the cells comprises an empty/full bit for indicating if a corresponding one of the cells is holding FIFO data;
    a clock coupled to each cell, said clock providing clock signals to each cell; and
    wherein each of the plurality of cells loads FIFO data only from an immediately previous full cell during a clock signal when the empty/full bit of the cell indicates that the cell is not holding FIFO data.

15. The apparatus of claim 14, wherein only one of the cells includes circuitry for receiving FIFO write data and only one of the other cells includes circuitry for outputting FIFO read data.

16. The apparatus of claim 15, wherein said only one of the cells receives FIFO write data during a same clock signal that said only one other of the cells outputs the FIFO read data.

17. The apparatus of claim 14, wherein the empty/full bit indicates that its corresponding cell is empty during a same clock signal wherein FIFO data in said corresponding cell is being loaded into a next FIFO cell from a previous FIFO cell, such that FIFO data in multiple successive full cells all advance forward one cell during same clock signal.

* * * * *